R. Knecht,
Ship Ventilator.
No. 570. Reissued July 6, 1858.
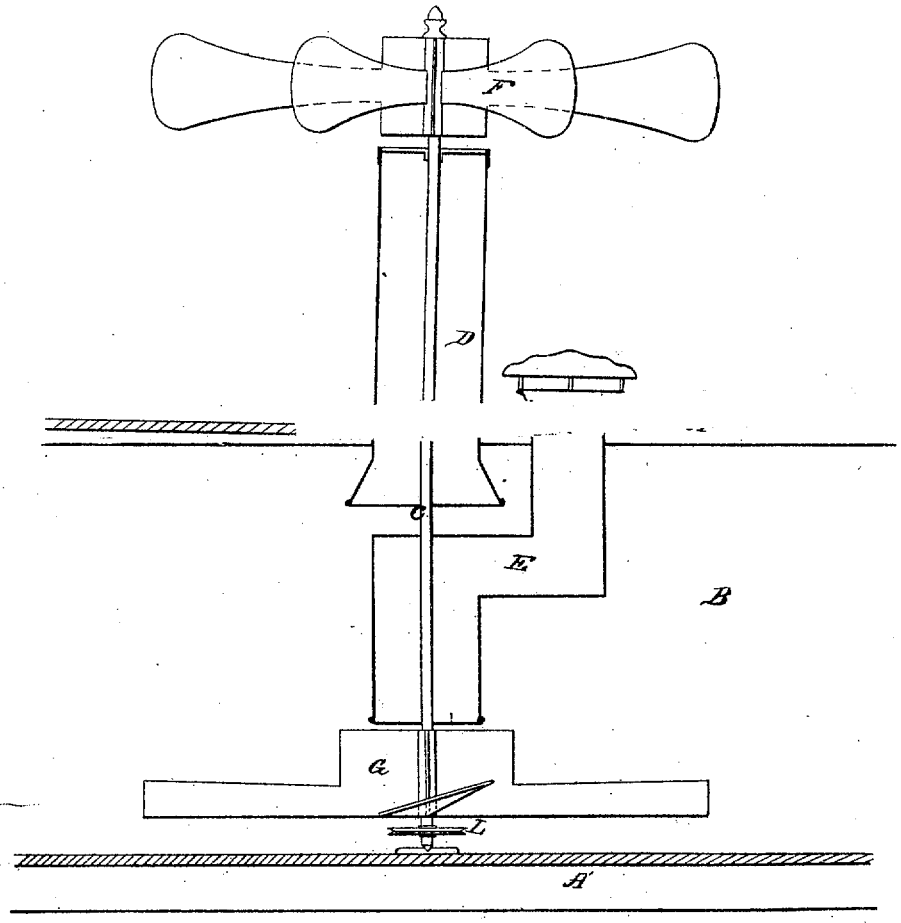
N. PETERS, PHOTO-LITHOGRAPHER, WASHINGTON, D. C.

UNITED STATES PATENT OFFICE.

RUDOLPH KNECHT, OF NEW YORK, N. Y.

IMPROVED METHOD OF VENTILATING SHIPS, &c.

Specification forming part of Letters Patent No. 16,059, dated November 11, 1856; Reissue No. 570, dated July 6, 1858.

*To all whom it may concern:*

Be it known that I, RUDOLPH KNECHT, of the city, county, and State of New York, have invented a new and useful Method of Ventilating Ships, Houses, Rooms, &c.; and I do hereby declare that the following is a full, clear, and exact description thereof, reference being had to the annexed drawing, which represents a vertical section of my improvement.

The nature of my invention consists in the [illegible] tubes in such a manner that by the rotation of the shaft and its wings foul air will be expelled and simultaneously fresh air, cooled air, or properly saturated air will be introduced.

In the accompanying drawing, A A′ represent the decks of a ship, the space B between which is to be ventilated. C is a shaft passing through both ventilating tubes D and E. F are wings attached to one end of the shaft C. G are wings attached to the other end of the said shaft. The shaft C may rest on the deck and run in, bearing on one of the tubes D, as represented in the drawing; or it may be supported by the frame of the machine, if it be found desirable to have a portable apparatus. The tube E serves for exhausting the foul air, and the tube D for introducing fresh air. They are therefore made to leave the deck through different openings.

In the tube E there may be placed a perforated plate, N, which may be covered with ice or with herb—such as mint—in order to cool or to saturate the fresh air as it passes through the said pipe.

L is a pulley for driving the shaft C, and its rotation may be effected by any one of the mechanical powers.

The operation of the apparatus is as follows: By the revolution of the shaft C the wings F will expel foul air through the tube D, and the wings G will simultaneously introduce fresh air through the tube E.

In the accompanying drawing both tubes are represented as [illegible] of both tubes may pass out through the side of the vessel or through the side walls of the room or house for the shaft C without altering the nature of my invention.

This method of ventilating may be applied with equal advantage to vessels, houses, rooms, or inclosed and covered spaces of any description.

I do not claim any single part of the apparatus as my invention; but

What I claim as new, and desire to secure by Letters Patent of the United States, is—

The ventilating of vessels, houses, rooms, or any other description of inclosed and covered spaces by expelling the foul air contained therein, and by simultaneously introducing in its stead fresh air, cooled air, or properly saturated air, by a combination and arrangement of two sets of wings on one shaft acting simultaneously, substantially as described.

RUDOLPH KNECHT.

Witnesses:

I. G. ESCHER,

CHARLES WEHLE.